C. H. MARTIN AND H. G. FARR.
FIFTH WHEEL CONSTRUCTION.
APPLICATION FILED SEPT. 27, 1919.
1,412,025.
Patented Apr. 4, 1922.
2 SHEETS—SHEET 1.
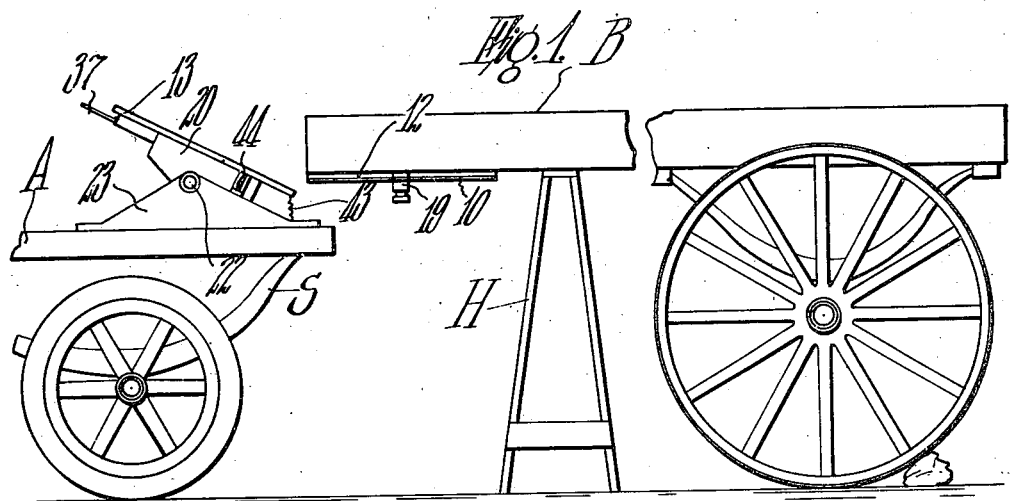
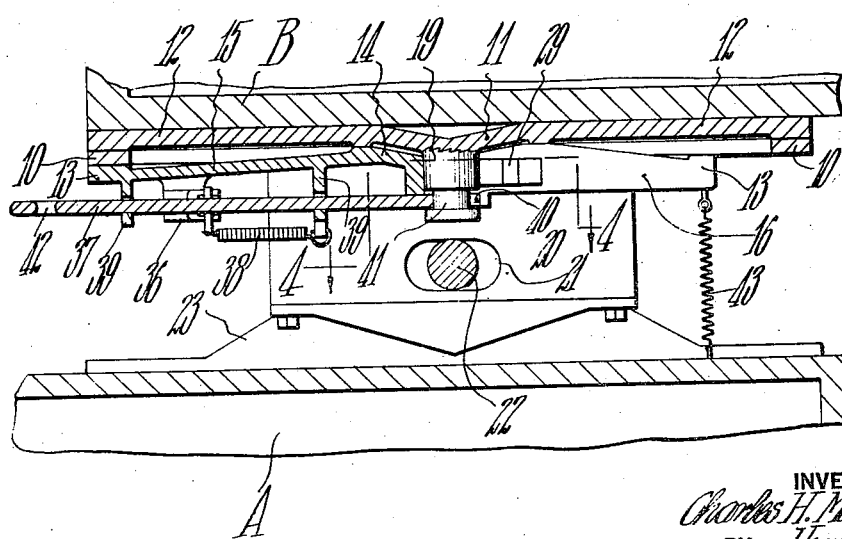
INVENTOR
Charles H. Martin and
BY Herman G. Farr.
Chapin + Neal
ATTORNEYS.

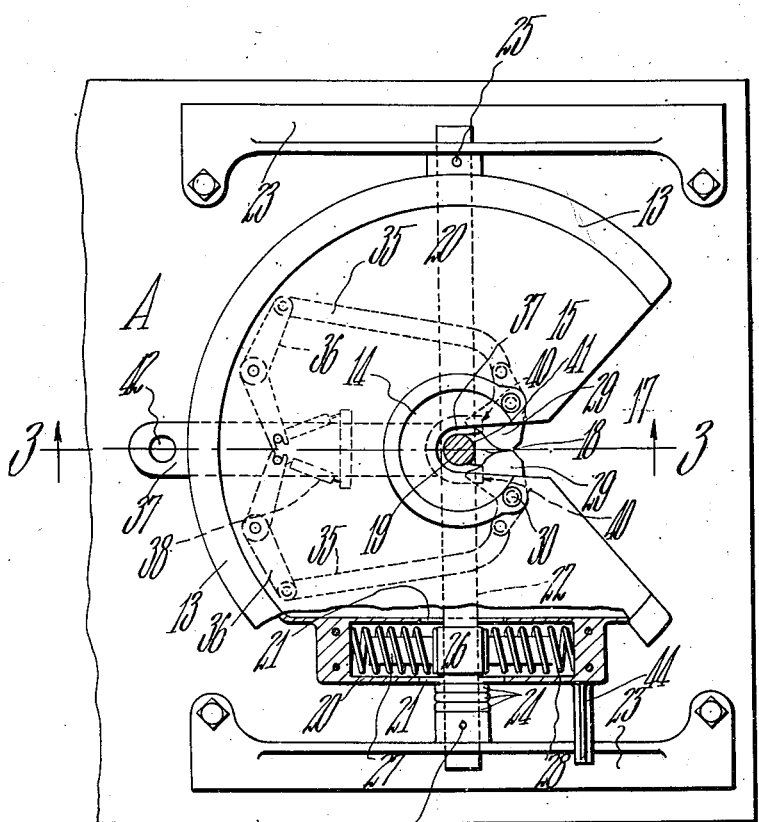

UNITED STATES PATENT OFFICE.

CHARLES H. MARTIN, OF WEST SPRINGFIELD, AND HERMAN G. FARR, OF SPRINGFIELD, MASSACHUSETTS; SAID FARR ASSIGNOR TO SAID MARTIN.

FIFTH-WHEEL CONSTRUCTION.

1,412,025.  Specification of Letters Patent.  Patented Apr. 4, 1922.

Application filed September 27, 1919. Serial No. 326,883.

*To all whom it may concern:*

Be it known that we, CHARLES H. MARTIN and HERMAN G. FARR, citizens of the United States of America, residing at West Springfield and Springfield, respectively, in the county of Hampden and State of Massachusetts, have invented certain new and useful Improvements in a Fifth-Wheel Construction, of which the following is a specification.

Our invention relates to an improved fifth wheel construction, which is particularly designed for connecting a trailer to a tractor for hauling, backing and turning.

This invention is concerned, among other things, with improvements in the fifth wheel construction of the above mentioned patent, to the end, that the operations of connecting and disconnecting the two vehicles is made more nearly automatic.

One object of the invention is to provide a fifth wheel construction in which the two units may be automatically coupled by a relative horizontal movement of the units without the necessity of also moving one or both of the units vertically. This renders unnecessary the use of jacks and the like for lifting the fore end of the trailer so that the king pin on one unit will clear the bolster plate on the other unit, as the tractor is backed in under the trailer.

Another object of the invention is to provide in a fifth wheel construction of the general type described, an automatic means for locking the mating bolster plates against relative vertical movement, thus dispensing with the necessity for attention from the operator.

Another object of the invention is to provide, in a fifth wheel construction having a fore and aft rocking connection, means to cause the rockable unit on one vehicle, as the tractor, to lie at a definite acute angle to the horizontal, when the trailer is disconnected from the tractor and in such a predetermined position as to form a cam, whereby the fore end of the trailer may be automatically raised, if necessary or desired, on a backing movement of the tractor.

A further object of the invention is to provide, in a fifth wheel construction, generally improved mechanical structure.

Other objects and advantages will appear in the following description and in the illustrative embodiment of the invention in the accompanying drawings, in which:

Fig. 1 is a fragmentary elevational view of a tractor showing a fifth wheel, embodying the invention, and a trailer in position for connection to the tractor;

Fig. 2 is an enlarged plan view, with parts broken away, of the fifth wheel;

Fig. 3 is a sectional elevational view taken on the line 3—3 of Fig. 2; and

Fig. 4 is a fragmentary plan view taken on the line 4—4 of Fig. 3.

Referring to these drawings and particularly to Fig. 1; A represents the tractor and B the trailer, both being shown merely in conventional form. Both tractor and trailer may be of any suitable construction and the invention is independent of the structural details of the two vehicles. The rear end only of the tractor has been shown. The trailer B has been illustrated as of the type known as the semi-trailer, viz., one having rear wheels only. The semi-trailer is, of course, the type of trailer generally preferred for use in tractor-trailer combinations where, as here, the fore end of the trailer rests upon the rear end of the tractor. However, the invention may, if desired, be used with a four wheel trailer, the front wheels then serving as a means for supporting the fore end of the trailer, when disconnected from the tractor. Generally, however, the semi-trailer is preferred and other suitable means, such as the horse H, are employed to support the front end of the trailer when disconnected from the tractor.

The fifth wheel device will next be described. It comprises two main units, as indicated in Fig. 1. One unit, herein shown as connected to the front end of the trailer body B, consists of a flat circular ring 10, or fifth wheel proper, and a bolster plate 11 concentrically located therein. The bolster plate 11 has integral and oppositely extending portions 12, which bridge diametrically across the fifth wheel 10. The portions 12 are connected to the fifth wheel 10 and the two are suitably fixed to the trailer body. The other unit, herein shown as attached to the rear of the body of the tractor A, likewise includes a fifth wheel portion 13 and a bolster plate 14, the latter being held to the former by a web 15. The fifth wheel 13, however, is not, as usually, a complete circular ring. Rather, it is broken away at the rear and on opposite sides of the longitudinal center line of the tractor A, to provide a wedge-like or fan-shaped opening 17, the sides of which widely diverge and diverge toward the rear end of the tractor. The bolster plate 14 is provided with an opening 18 which preferably extends vertically therethrough and is adapted to receive a king bolt 19, which, as shown in Fig. 3, is formed as an integral extension of the bolster plate 11. The rear wall of opening 18 is semi-circular to provide a bearing for king pin 19 and the opening extends toward and merges into the larger fan-shaped opening 17.

The lower fifth wheel unit embodies the spring draw bar feature. Thus, the unit, which includes the portions 13, 14, and 15, is, as shown, one integral casting, which, below the fifth wheel portion 13, is so fashioned as to afford two parallel depending boxes 20 arranged one on each side of, and parallel to, the longitudinal center line of tractor A. The side walls of the boxes 20 are slotted, as indicated at 21 in Fig. 3, and through these slots 21, a shaft 22 passes diametrically and laterally of the tractor across, but below, the fifth wheel 13. The ends of shaft 22 are mounted in two brackets 23 (Fig. 2) which are adapted for attachment in spaced parallel relation to the body of tractor A. The shaft 22 is fixed at its ends in the brackets 23, and suitable spacing washers 24 are provided on shaft 22 to prevent lateral movement of the fifth wheel units relatively to shaft 22. Rotatably mounted upon shaft 22, and within each box 20, is a block 26 having two oppositely extending cylindrical studs 27. Loosely coiled about each of the latter and acting between one face of block 26 and an end wall of box 20 is spring 28. These springs 28 function as shock absorbers either on pulling or backing of the tractor and provide the spring draw bar feature heretofore mentioned.

In order to confine the king pin 19 in the opening 18 of bolster plate 14, latching mechanism is provided, which permits the movement of pin 19 into opening 18 but prevents movement of the pin in the opposite direction. Such mechanism includes a pair of latches 29, each mounted on a vertical pivot 30 and movable in a slot 31 formed in the casting of the lower unit. The latches are mounted one on each side of the longitudinal center line of the lower unit and extend in opposite directions into the opening 18 and preferably into abutting relation. A stop, in the character of a shoulder 32 formed in the casting of the lower unit, is provided for each latch 29, to prevent outward movement (toward the fan shaped opening 19) beyond the position illustrated. The latches 29 are, furthermore, provided with arcuate surfaces 33, which, when the latches are in their normal positions, as illustrated, are concentric with the king pin 19 and, since such surfaces are curved with a radius equal to that of pin 19, they afford a substantial bearing for the latter for the hauling and turning movements. On each latch 29 is an integral arm 34 which is connected by a link 35 to one end of a lever 36 pivoted intermediate its ends to the web 15. There are, of course, two levers 26, and their free ends extend toward one another into adjacent relation and are forked to straddle a bar 37. Springs 38 connect the last named ends of levers 36 to suitable fixed points on the web 15 and tend to hold the latches 29 in the illustrated position.

The bar 37, just referred to, is slidably mounted in depending lugs 39 and is normally held in its inner, and illustrated position, by the springs 38. Stops, in the character of shoulders 40 formed on the casting of the lower unit, limit the extent of such inward movement. The inner end of bar 37 is forked, as indicated in Fig. 2, to fit into a circumferential groove 41 in the king pin, whereby the latter, and the mating bolster plates 11 and 14, may be held against relative vertical movement. The springs 38 normally hold bar 37, as well as latches 29, in king pin locking position and the bar 37 is adapted to be manually moved radially outward to withdraw its forked end from the groove 41, as well as to simultaneously retract the latches 29 from the opening 18. An eye 42, or any other suitable means, is provided in the bar 37 to permit it to be manually moved and, as indicated in Fig. 1, the bar 37 is so located as to be conveniently accessible from the driver's seat of the tractor A.

Preferably, means are also provided to insure that the lower unit of the fifth wheel device assumes a definite, predetermined position such that the fifth wheel 13 is inclined to the horizontal, when the tractor and trailer are disconnected. This result may be accomplished in any suitable manner, as by a spring 43 (Figs. 1 and 3), which connects a rearward portion of the lower fifth wheel unit to the body of tractor A. This spring causes the fifth wheel to incline downwardly toward the rear of the tractor into such position that it forms a cam, to engage the fore end of the trailer when the tractor is backed thereinunder. Any suitable stop, as a projection 44 on one of the spring boxes 20 arranged to engage the adjacent bracket 23, limits the downward movement of the fifth wheel.

This cam arrangement is not required for the usual purpose, such as lifting the king pin up and over the lower bolster plate, but for another important purpose now to be disclosed. In practical operation, when the tractor A is drawing a loaded semi-trailer B, considerable weight is imposed on the rear end of the tractor, causing the springs S thereof to be compressed and the plane of the tractor body to be lowered. In disconnecting the two vehicles, a horse H, or other suitable supporting means, is placed under the front end of the trailer and the tractor is disconnected therefrom, in a manner to be described, and drawn away. The horse H is generally of such height that the trailer body drops only slightly as the tractor is disconnected therefrom but the tractor body, being now unloaded, rises to some extent as the load is removed from the hitherto compressed springs S. Therefore, the tractor fifth wheel unit has risen and the trailer fifth wheel fallen to some extent, so that a subsequent connection of the two vehicles is not readily made without jacking up the trailer body or without providing some other means to lift the latter. By causing the lower fifth wheel unit to automatically tilt into position to function as a cam, the necessary lift of the trailer, to permit connection of the vehicles without manual assistance, is obtained.

As to the remaining features of operation; in connecting the vehicles, the tractor A is backed towards the trailer B and the front end of the latter strikes the inclined fifth wheel 13. Sometimes, the trailer may strike the latter at points beyond its transverse diameter, thereby causing the wheel 13 to immediately tilt back toward a horizontal position and into parallelism, or substantial parallelism, with the upper fifth wheel 10. More often, however, the trailer B strikes to the rear of the transverse diameter of wheel 13; and it will then be first forced up the inclined plane, formed by fifth wheel 13, until it passes such diameter, whereupon the described tilting will occur.

In backing the tractor A into place beneath the trailer, it is steered approximately into place. Extreme care in steering, however, is not essential for, upon the described tilting of wheel 13, pin 19 will lodge somewhere in the fan shaped opening 17 and, on continued backing of the tractor, will be forced by one or the other of the inclined walls of such opening toward, and eventually into line with, the opening 18. Thus, the king pin may be automatically guided into position for the coupling operation.

The coupling of the vehicle is also automatically accomplished on continued backing of the tractor. Thus, the king pin 19 eventually engages the rear sides of the latches 29 and these yield inwardly to permit the king pin 19 to pass thereby and into concentric relation with the lower bolster plate 14. As the pin reaches such position, the springs 38 automatically restore the latches into the illustrated position with their curved surfaces 33 lying contiguous with the pin to take the strain of hauling. The stops 32 effectually prevent outward movement of pin 19. Simultaneously with the closing of latches 29, the bar 37 is drawn inwardly by springs 38 to engage in groove 41 for the purpose of locking the two fifth wheel units against relative displacement.

To disconnect the vehicles, a support, as the horse H, preferably of such height as to closely underlie the front end of the trailer, is placed thereinunder. The bar 37 is then pulled forwardly, whereupon the king pin 19 is free for both horizontal and vertical movement, so that the tractor A can be driven away from the trailer, allowing it to rest on the horse H. The release of the king pin, although manually accomplished, may nevertheless be effected with convenience by the driver of the tractor due to the location of the free end of the bar 37.

The invention has been disclosed herein, in an embodiment at present preferred, for illustrative purposes but the scope of the invention is defined by the appended claims rather than by the foregoing description.

I claim,—

1. In combination, mutually engageable bolster plates, one having a projecting king pin and the other an opening to receive the latter, said opening extending radially outwards to the periphery of its plate, and means normally closing said opening intermediate its ends to form a socket for said pin, said means being yieldable to permit passage of the king pin through the opening into but not out of said socket, and means operable by said last named means to lock the king pin against axial movement in its socket.

2. A fifth wheel unit, comprising, a fifth wheel portion and a bolster plate portion concentrically located therein, a radial passage extending from the center to the periphery of said plate, an outwardly diverging fan shaped passage connecting said opening to the outer periphery of the fifth wheel portion, latching means normally closing the first named passage intermediate its ends to form a central king pin receiving socket, said devices being yieldable by engagement with the king pin only on inward passage of the latter, a member radially slidable across said plate and having a U-shaped recess in its end adapted to straddle said pin, means connecting said latching means and member for simultaneous operation, and manually operable means to move the latching means and member to release the king pin for outward movement.

3. In combination, mutually engageable bolster plates, one having a projecting king pin with a circumferential groove therein and the other an opening to receive said pin, said opening extending outwardly to the periphery of its plate, means normally closing said opening intermediate its ends to form a socket for said pin, said means being yieldable to permit passage of the pin through the opening into but not out of said socket, and a part movable with said means to engage in said recess and lock said pin against axial movement in its socket.

CHARLES H. MARTIN.
HERMAN G. FARR.